UNITED STATES PATENT OFFICE.

BENJAMIN S. TOOTHILL, OF HOBART, INDIANA, ASSIGNOR TO HIMSELF, WILLIAM GUTHRIE, AND JOHN B. GUTHRIE.

IMPROVEMENT IN PROCESSES FOR THE MANUFACTURE OF SIRUPS.

Specification forming part of Letters Patent No. 198,474, dated December 25, 1877; application filed October 3, 1877.

*To all whom it may concern:*

Be it known that I, BENJAMIN S. TOOTHILL, of Hobart, in the county of Lake and State of Indiana, have invented certain new and useful Improvements in the Manufacture of Sirups; and I do hereby declare the following to be a full, clear, and exact description of the invention, such as will enable others skilled in the art to which it pertains to make and use it.

My invention relates to certain improvements in the manufacture of sirups, and is designed to provide a sirup made from corn or other cereal.

It consists in subjecting ground or comminuted corn or other cereal to a mashing process, in which hot water is used in connection with a small proportion of barley-malt. After being agitated for a suitable length of time, the mass is treated with cold water, then allowed to settle, when the liquor is drawn off and boiled down to the desired consistency of sirup.

The process, more in detail, is as follows: Corn known as "Indian corn," in any of its several varieties—though the special variety of the same commonly called "sweet corn" is preferable—is first reduced by grinding or otherwise to a coarse meal or chop. The latter is then subjected to a mashing process, according to which one hundred pounds, more or less, of the said meal is treated with about forty gallons of hot water, to which is added a small proportion of barley-malt. The quantity of the latter is preferably about one-twenty-fifth of the entire mash, though an accurate and unvarying proportion of the several elements is unnecessary. After this mash has been stirred well approximately for two hours, cold water should be added thereto in a quantity the same as that first applied in hot water—that is, under the above-conditioned premise, forty gallons of cold water should be used. The mass is then allowed to stand for a suitable length of time until the solid part has settled, which will probably require from one to two hours. When fully settled the liquor is drawn off from the mass, and boiled down in any suitable manner until it has obtained the consistency desirable in the sirup. This completes the process, and the article of sirup thus made is ready to be used for the ordinary purposes of a sweetening-liquid.

Having fully described my invention, what I claim as new, and desire to secure by Letters Patent, is—

The process of manufacturing sirup, consisting, essentially, in mashing ground or comminuted corn or other cereal, together with a small proportion of barley-malt, in hot water, then adding cold water, and allowing the mash to stand and settle, and, finally, reducing the resultant liquor by evaporation to a sirup, substantially as described.

BENJAMIN S. TOOTHILL.

Witnesses:
F. C. STEPHENS,
E. B. TREE.